(12) United States Patent
Kopp

(10) Patent No.: US 9,309,900 B2
(45) Date of Patent: Apr. 12, 2016

(54) ELECTRO-HYDRAULIC SERVO VALVE

(75) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 79 days.

(21) Appl. No.: 14/373,805

(22) PCT Filed: Feb. 9, 2012

(86) PCT No.: PCT/US2012/024547
§ 371 (c)(1),
(2), (4) Date: Jul. 22, 2014

(87) PCT Pub. No.: WO2013/119240
PCT Pub. Date: Aug. 15, 2013

(65) Prior Publication Data
US 2015/0069278 A1  Mar. 12, 2015

(51) Int. Cl.
*F16K 31/04* (2006.01)
*F15B 13/044* (2006.01)

(52) U.S. Cl.
CPC ........... *F15B 13/0444* (2013.01); *F15B 13/044* (2013.01); *F16K 31/042* (2013.01); *Y10T 137/86622* (2015.04)

(58) Field of Classification Search
CPC .. F15B 13/0444; F15B 13/044; F16K 31/042; Y10T 137/86622
USPC .......................... 251/129.11, 279; 137/625.65
See application file for complete search history.

(56) References Cited

U.S. PATENT DOCUMENTS 2,767,689 A   10/1956  Moog, Jr.
2,920,650 A   1/1960   Moog, Jr.
3,103,739 A   9/1963   Moog
3,228,423 A   1/1966   Moog, Jr.
(Continued)

FOREIGN PATENT DOCUMENTS

CN   201297301 Y    8/2009
DE   199 09 712 A1  9/2000
(Continued)

OTHER PUBLICATIONS

The International Search Report (ISR) for International (PCT) Application No. PCT/US2012/065545; Publication No. WO 2013/126105; dated Apr. 16, 2013.
(Continued)

*Primary Examiner* — John Bastianelli
(74) *Attorney, Agent, or Firm* — Phillips Lytle LLP

(57) ABSTRACT

A valve (210) comprising a motor (221) having an output shaft (231) orientated about a motor axis (230), a hydraulic valve having a drive spool (224) configured to move from a first position to a second position, a mechanical linkage (222) between the output shaft (231) and the drive spool (224) having a sleeve (232) mechanically coupled to the output shaft (231), a pole shaft (233) configured for sliding engagement in a direction generally perpendicular to the motor axis, a link (235) connected to the pole shaft (233) by a pivot joint (234), a drive shaft (252) coupled to the link (235) and rotatable about a drive axis, the drive shaft (252) having an end portion to engage and apply a force to the spool (224), and a spring (223) to provide a bias between the pole shaft (233) and the sleeve (232), such that a distance between the motor axis and the pivot joint multiplied by a distance between the drive axis and the applied force is less than a distance between the drive axis and the pivot joint.

9 Claims, 16 Drawing Sheets

(56) References Cited

U.S. PATENT DOCUMENTS

| | | | | |
|---|---|---|---|---|
| 4,190,081 | A | * | 2/1980 | Coles ................ F15B 13/0402 137/625.65 |
| 4,203,507 | A | | 5/1980 | Tomita et al. |
| 4,325,412 | A | | 4/1982 | Hayner |
| 4,466,597 | A | | 8/1984 | Vanderlaan |
| 4,641,812 | A | | 2/1987 | Vanderlaan et al. |
| 4,742,322 | A | | 5/1988 | Johnson et al. |
| 4,951,549 | A | | 8/1990 | Olsen et al. |
| 5,031,563 | A | | 7/1991 | Matre |
| 5,031,653 | A | | 7/1991 | Wilson et al. |
| 5,133,386 | A | * | 7/1992 | Magee ................ F15B 13/0438 137/625.65 |
| 5,146,126 | A | | 9/1992 | Hutchins |
| 5,263,680 | A | | 11/1993 | Laux |
| 5,722,460 | A | * | 3/1998 | Olsen ................ F15B 13/0402 137/625.65 |
| 6,000,678 | A | | 12/1999 | Coakley |
| 6,199,588 | B1 | | 3/2001 | Shapiro |
| 6,460,567 | B1 | * | 10/2002 | Hansen, III ............ F16K 31/04 251/129.11 |
| 6,786,236 | B2 | * | 9/2004 | Jansen ................ F15B 13/0402 137/625.61 |

FOREIGN PATENT DOCUMENTS

| | | |
|---|---|---|
| EP | 0038128 A1 | 10/1981 |
| EP | 0 102 884 A1 | 3/1984 |
| EP | 1067321 A2 | 9/2000 |
| FR | 1 409 269 A | 8/1965 |
| FR | 1409269 A | 8/1965 |
| FR | 2 281 533 A1 | 3/1976 |
| FR | 2281533 A1 | 3/1976 |
| JP | S59-47508 A | 3/1984 |
| JP | 2-29368 U | 2/1990 |
| JP | H0797200 A | 4/1995 |
| JP | H08-028717 A | 2/1996 |
| JP | 2002-527686 A | 8/2002 |
| JP | 2011-256917 A | 12/2011 |
| WO | 90/02884 A1 | 3/1990 |
| WO | 00/22304 A1 | 4/2000 |
| WO | 03/014577 A1 | 2/2003 |

OTHER PUBLICATIONS

The International Search Report (ISR) for International (PCT) Application No. PCT/US2012/024547; Publication No. WO 2013/119240; dated Nov. 2, 2012.

The Written Opinion of the International Search Authority for International (PCT) Application No. PCT/US2012/024547; Publication No. WO 2013/119240; dated Nov. 2, 2012.

The International Preliminary Report on Patentability for International (PCT) Application No. PCT/US2012/024547; Publication No. WO 2013/119240; dated Aug. 12, 2014.

"Digital Valves for Fluid Control". Victor Controls, LLC. Dated May 2, 2002. Accessed at http://www.victorycontrols.com/ds%20servo.pdf on Sep. 14, 2011.

* cited by examiner ions or surfaces of the disclosed embodiment, merely for the purposes of illustration and not by way of limitation, the present invention provides an electro-hydraulic valve (210) comprising a rotary electric motor (221) having an output shaft (231) orientated about a motor axis (230), a hydraulic valve having a valve drive spool (224) configured and arranged to move relative to a valve cylinder (238) from a first position to a second position, a mechanical linkage (222) between the output shaft (231) and the drive spool (224), the mechanical linkage (222) having a sleeve (232) mechanically coupled to the output shaft (231), a pole shaft (233) configured and arranged for sliding engagement relative to the sleeve in a direction generally perpendicular to the motor axis, a link (235) connected to the pole shaft by a pivot joint (234), a drive shaft (252) coupled to the link and configured and arranged to rotate about a drive axis (240), the drive shaft having an end portion (237) configured and arranged to engage and apply a force to the spool, and a spring (223) configured and arranged to provide a bias between the pole shaft and the sleeve, the mechanical linkage configured and arranged such that a distance (R1) between the motor axis and the pivot joint multiplied by a distance (R3) between the drive axis and the applied force is less than a distance (R2) between the drive axis and the pivot joint, such that rotation of the electric motor causes the drive spool to move from the first position to the second position.

ELECTRO-HYDRAULIC SERVO VALVE

TECHNICAL FIELD

The present invention relates generally to the field of hydraulic servo valves, and more particularly to electrically controlled hydraulic servo valves.

BACKGROUND ART

Numerous servo valve configurations are known in the prior art. U.S. Pat. No. 6,199,588 entitled "Servovalve Having a Trapezoidal Drive" discloses a servo valve having a trapezoidal shaped drive element for interfacing an electric motor to a valve spool attached to a bias spring.

U.S. Pat. No. 6,000,678 entitled "Motor/Spool Interface for Direct Drive Servovalve" is directed to a direct drive servo valve having a motor shaft with an engagement member which causes a valve member to reciprocate with rotation of the shaft.

U.S. Pat. No. 4,742,322 entitled "Direct Drive Servovalve with Rotary Force Motor" teaches a direct drive servo valve having a limited angle rotary force motor. The motor has an output shaft with an eccentric arm with a ball for interfacing with a valve spool.

U.S. Pat. No. 4,641,812 entitled "Direct Drive Valve and Force Motor Assembly Including Interchangeable Stator Assembly and Alignment System or Method" discloses a direct drive servo valve having a magnetic spring and a flexible drive shaft with an eccentric to convert rotation motion to linear motion. The valve assembly includes a calibration nut for adjusting the hydraulic valve null relative to the magnetic spring null.

U.S. Pat. No. 4,951,549 entitled "Differential Cylinder Pressure Gain Compensation for Single Stage Servovalve" discloses a digital servo valve having an electric DC stepping motor connected to a ball screw mechanism for converting motor rotation into displacement of a hydraulic four-way spool valve. The assembly includes a torsion bar fixed to a valve spool coupling journal.

U.S. Pat. No. 5,031,653 entitled "Differential Cylinder Pressure Gain Compensation for Single Stage Servovalve" discloses a single stage reciprocating valve spool attached to mechanical feedback springs. The valve spool is driven by an electrically controlled torque motor.

U.S. Pat. No. 5,263,680 entitled "Motor-To-Spool Coupling for Rotary-To-Linear Direct Drive Valve" discloses a valve having a coupling between an electric motor and a valve spool for converting rotary to linear motion. The motor contains a shaft with a pin intimately coupled to a shaped, outwardly expandable bushing having flat and arcuate surfaces.

BRIEF SUMMARY OF THE INVENTION

With parenthetical reference to the corresponding parts, portions or surfaces of the disclosed embodiment, merely for The electric motor may be a torque motor, a toroidal motor, or a solid state actuator. The first position may be a closed position and the second position may be an open position. The end portion may be a quill. The drive shaft may be held in a bearing (236). The spring may be configured and arranged to urge the pole shaft relative to the sleeve so as to decrease the distance between the motor axis and the pivot joint. The spring may be configured and arranged to be in a compressed state when the drive spool is in the first position and to be in a compressed state when the drive spool is in the second position. The spring may be configured and arranged to reduce backlash in the mechanical linkage. The drive shaft may be coupled to the link by compressive engagement and the compression may be adjustable with a set screw (251).

In another aspect, an electro-hydraulic valve is provided comprising an actuator (221) having an output shaft (231) orientated about a motor axis (230), a hydraulic valve having a valve drive spool (224) configured and arranged to move relative to a reference (220) from a first position to a second position, a mechanical linkage between the output shaft and the drive spool, the mechanical linkage having a first link (233) mechanically coupled (232) to the motor output shaft, a second link (235) rotatable about a drive axis (240) relative to the reference and connected to the first link at a first mechanical interface (234) and mechanically coupled to the spool at a second mechanical interface (237), the mechanical linkage configured and arranged such that a distance (R1) between the motor axis and the first mechanical interface multiplied by a distance (R3) between the drive axis and the second mechanical interface is less than a distance (R2) between the first interface and the drive axis, wherein actuation of the actuator causes the drive spool to move from the first position to the second position.

The actuator may be a torque motor, a toroidal motor, a solid state motor or a MEMS microvalve-controlled hydraulic motor. The first position may be a closed position and the second position may be an open position. The first link may be mechanically coupled to the motor output shaft through sliding engagement. The sliding engagement may be in a direction generally perpendicular to the motor axis. The first link may be mechanically coupled to the output shaft through a sleeve. The first mechanical interface may comprise a pivot joint. The first mechanical interface may comprise a geared interface. The second mechanical interface may comprise a quill attached to the second link and configured and arranged to engage and apply a force to the drive spool. The second link may be coupled to the reference through a bearing (236). The reference may comprise a servo valve housing. The electro-hydraulic valve may further comprise a bias mechanism (223) configured an arranged to urge the spool towards the first position. The bias mechanism may be a spring. The spring may be configured and arranged to urge the first link so as to decrease the distance between the motor axis and the first mechanical interface. The spring may be configured and arranged to be in a compressed state when the drive spool is in the first position and in the second position. The bias mechanism may be configured and arranged to reduce backlash in the mechanical linkage. The mechanical linkage may comprise a drive shaft (252) configured and arranged between the second link and the second mechanical interface. The drive shaft may be compressively engaged by the second link and a set screw (251).

In another aspect, an electro-hydraulic valve is provided comprising an actuator (221) having an output shaft (231) orientated about a motor axis (230), a hydraulic valve having a valve drive spool (224) configured and arranged to move relative to a reference (220) from a first position to a second position, a mechanical linkage between the output shaft and the drive spool, the mechanical linkage having a first link (233) mechanically coupled (232) to the motor output shaft, a second link (235, 252) configured and arranged to form a lever about a fulcrum point (240) and having a first lever arm on one side of the fulcrum point and a second lever arm on the opposite side of the fulcrum point, the first lever arm having a first mechanical connection (234) to the first link and the second lever arm having a spool contact interface, the second link configured and arranged to provide a mechanical advantage about the fulcrum point, wherein actuation of the actuator causes the drive spool to move from the first position to the second position.

The first link may comprise a pole shaft mechanically coupled to the output shaft through a shaft sleeve. The first link may comprise a head end (239) and a pivot end, and the first mechanical connection may comprise a floating pivot joint between the pivot end of the first link and the first lever arm. The electro-hydraulic valve may further comprise a spring configured and arranged between the pole shaft head end and the shaft sleeve. The spring may be compressed when the drive spool is in the first position and the second position. The second link may be mounted in a bearing. The fulcrum point may comprise a pivot joint. The spool contact interface may comprise a quill.

DETAILED DESCRIPTION OF THE PREFERRED EMBODIMENTS

Figure 1:
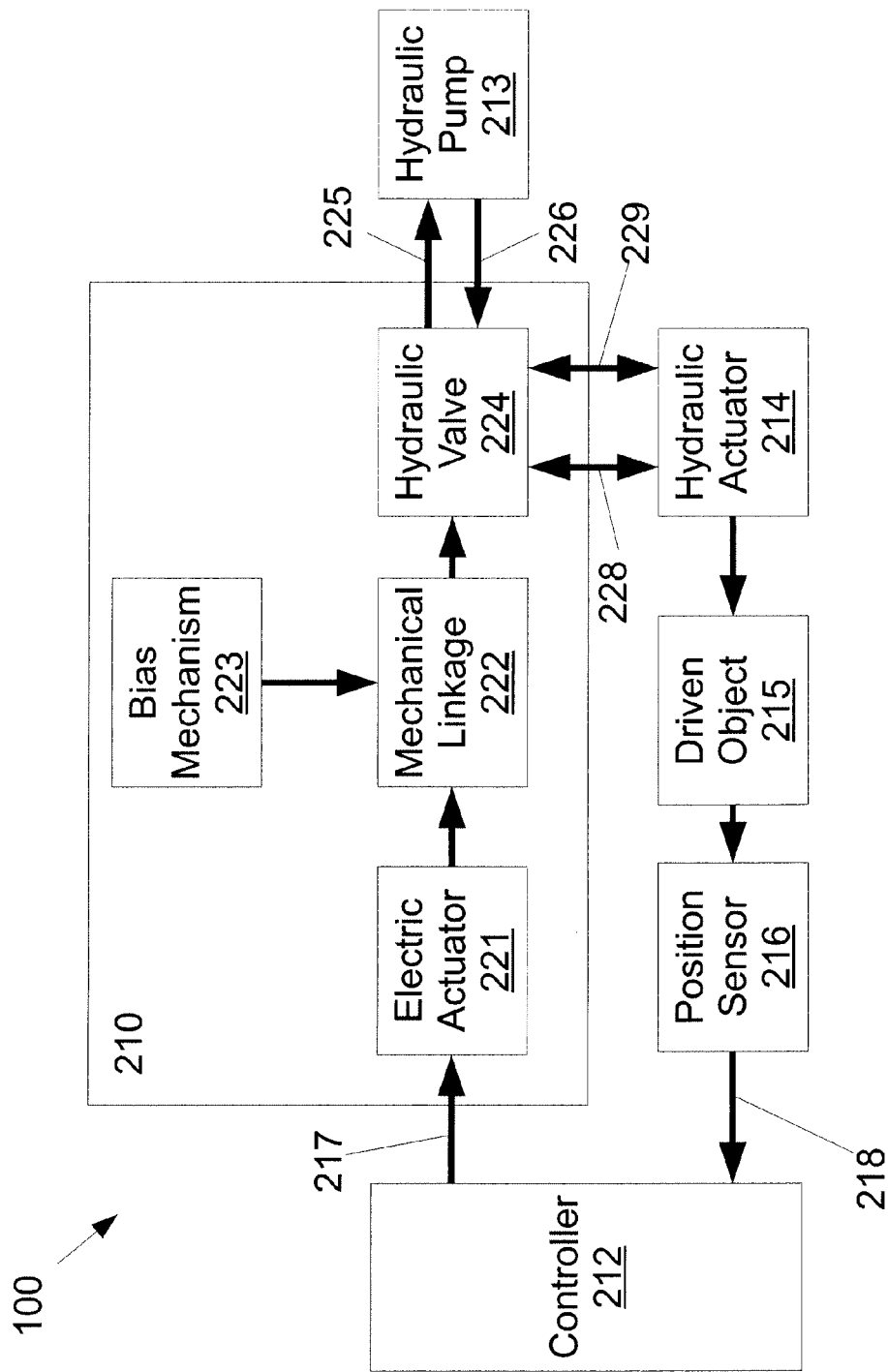
FIG. 1 is an object diagram of a first general embodiment of the servo valve system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1, this invention provides an improved electro-hydraulic valve system, a first embodiment of which is generally indicated at 210. As shown in FIG. 1, valve system 210 is typically used in a larger servo system 100 that generally includes controller 212, hydraulic pump 213, hydraulic actuator 214, driven object 215, and position sensor 216. Servo system 100 is configured to control the position of driven object 215 by commanding valve system 210 to control hydraulic control ports 228 and 229, which are connected to actuator 214.

As shown, valve system 210 generally includes electric actuator 221, mechanical linkage 222, hydraulic valve 224, and bias mechanism 223. Electro-hydraulic valve 210 is connected to hydraulic pump 213 through hydraulic supply line 226 and hydraulic return line 225. Electro-hydraulic valve 210 also connects to hydraulic actuator 214 through control port 228 and control port 229.

Controller 212 provides servo command 217 to electro-hydraulic valve 210. Command 217 correlates to a desired set point. The set point is typically a desired position of driven object 215 or a desired velocity of movement of driven object 215. Hydraulic valve 210 controls hydraulic power from hydraulic pump 213 to hydraulic actuator 214 based upon command 217 received from controller 212.

Hydraulic actuator 214 is arranged to mechanically drive object 215 when there is a difference in the hydraulic pressure between control port 228 and control port 229. The position of object 215 is detected by position sensor 216 and the output of sensor 216 is provided as feedback 218 to controller 212. A feedback loop is implemented through controller 212 such that controller 212 adjusts command 217 as a function of the magnitude of feedback 218 received.

In normal operation, controller 212 actively provides command 217 in the form of an analog electric current to rotary torque motor 221. Torque motor 221 generates a torque on its output shaft 231 which is generally proportional to current 217. The torque on output shaft 231 is converted into a linear force by mechanical linkage 222, which acts on hydraulic valve 224.

Hydraulic valve 224 receives hydraulic supply line 226 from hydraulic pump 213 and returns hydraulic return line 225 to hydraulic pump 213. Hydraulic valve 224 is connected to control port 228 and control port 229 such that, as the position of valve 224 changes, a differential pressure is produced between control port 228 and control port 229. This differential pressure causes hydraulic actuator 214 to drive object 215.

Bias mechanism 223 urges mechanical linkage 222 towards a position in which valve 224 causes approximately equal pressures in control port 228 and control port 229, which is also called a null position or configuration.

Figure 2:
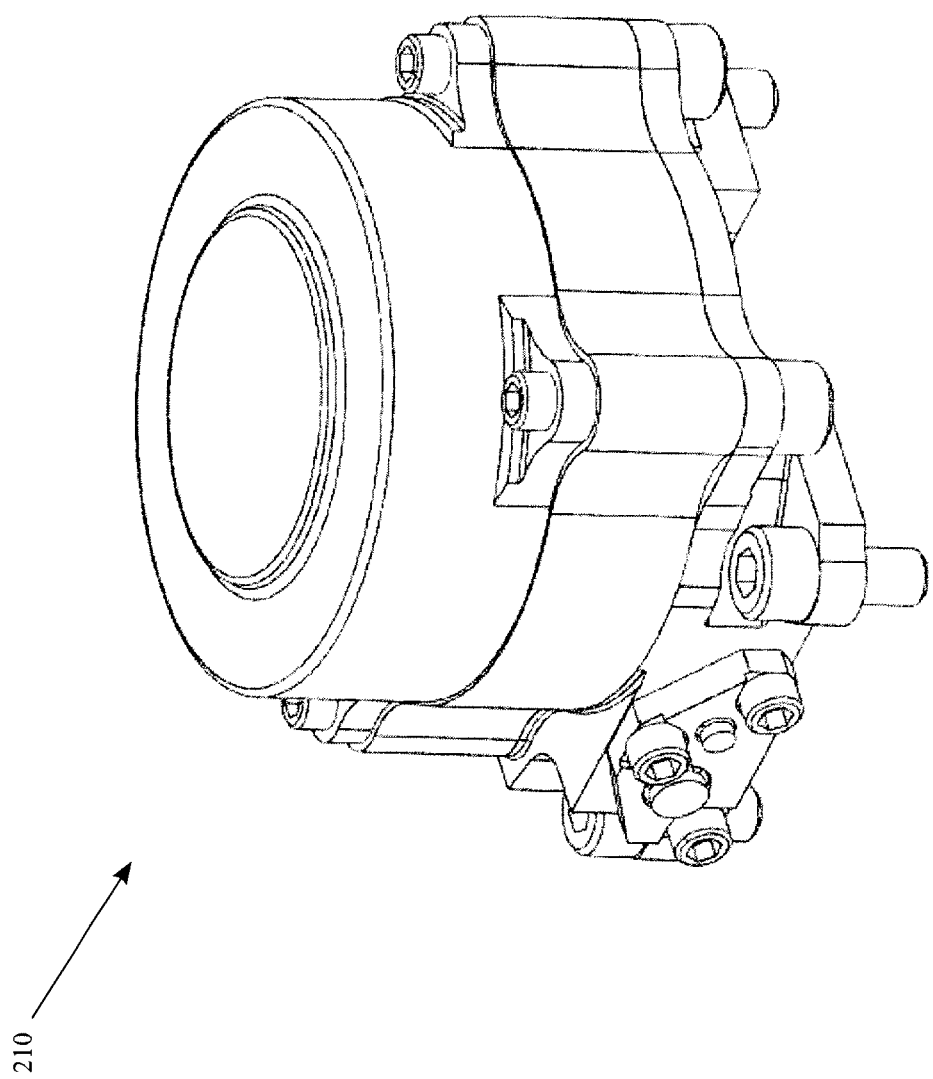
FIG. 2 is a perspective view of a first specific embodiment of the servo valve shown in FIG. 1.
Figure 4:
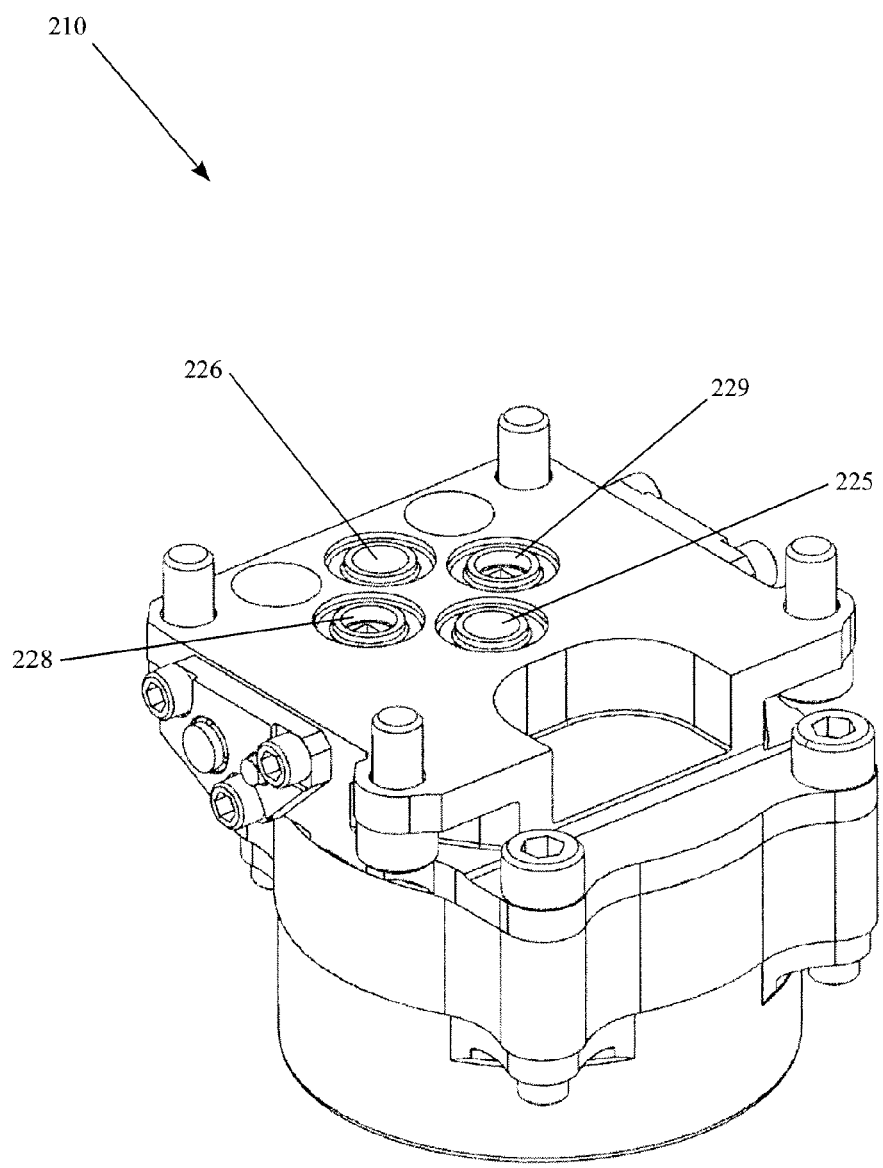
FIG. 4 is a bottom perspective view of the servo valve shown in FIG. 2.

FIG. 2 is an isometric top view of first embodiment valve system 210. FIG. 4 is an isometric bottom view of system 210, showing hydraulic supply port 225, return port 226, control port 228, and control port 229.

Figure 3:
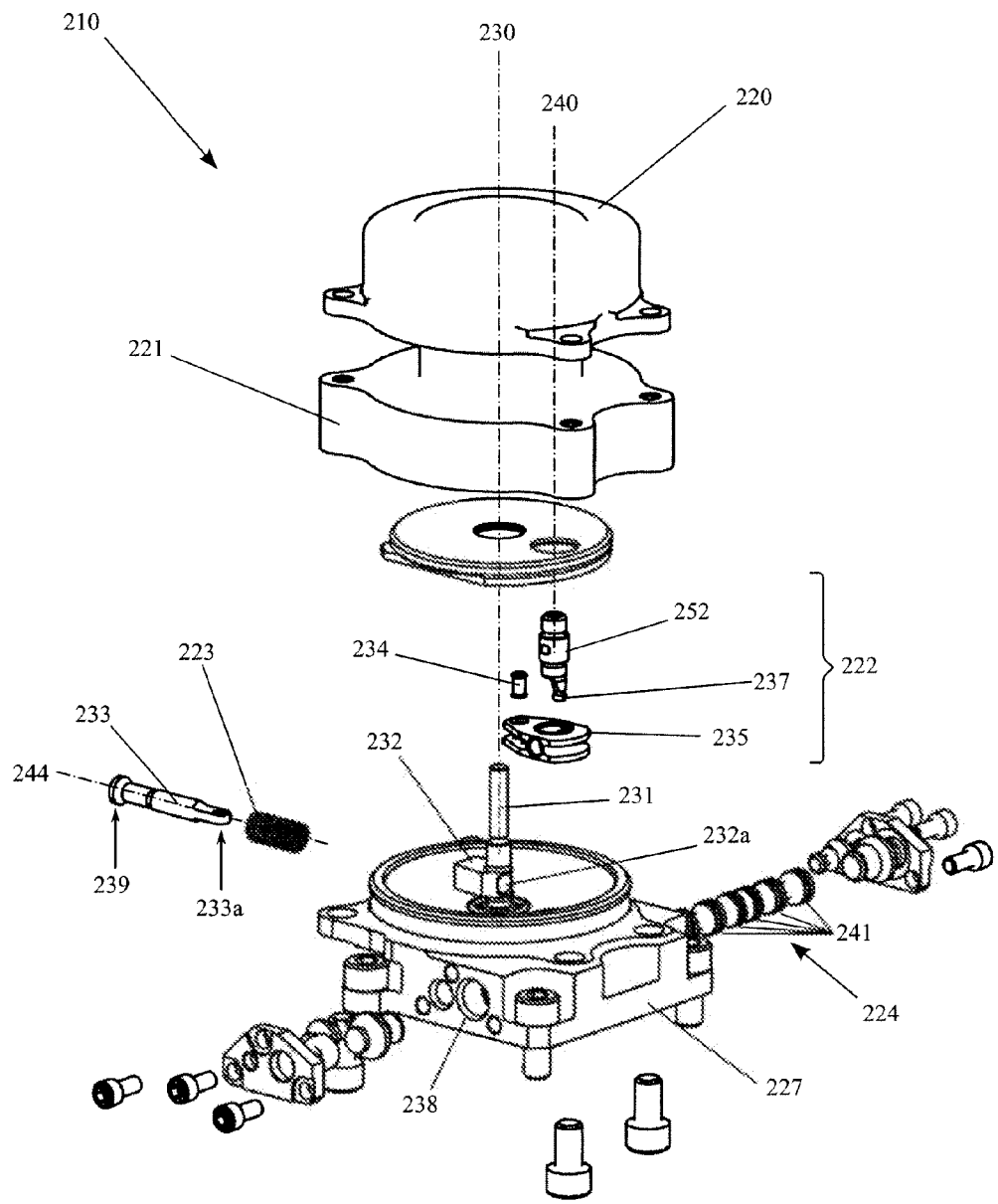
FIG. 3 is an exploded view of the servo valve shown in FIG. 2.

FIG. 3 is an exploded isometric view of valve system 210. As shown in FIG. 3, valve system 210 houses its main elements in a sealed cavity formed from housing upper portion 220 and body 227, which are bolted together. Arranged within the sealed cavity are: electric actuator 221; motor output shaft 231 and output shaft sleeve 232; pole shaft 233 and spring 223; drive link 235 and pin 234; quill drive shaft 252 and quill 237; and valve spool 224.

Electric actuator 221 is a rotary torque motor having output shaft 231 that is driven to rotate about axis 230. However, while a rotary torque motor is shown and described, it is contemplated that other types of motors may be used such as a toroidal motor, a stepper motor, an induction motor, a hybrid motor, or other similar actuators.

Motor output shaft 231 is formed together from the same metal casting mold as output shaft sleeve 232 such that they move together as a single unitary member. Alternatively, output shaft 231 and output shaft sleeve 232 can be formed from separate pieces and welded together.

Figure 6:
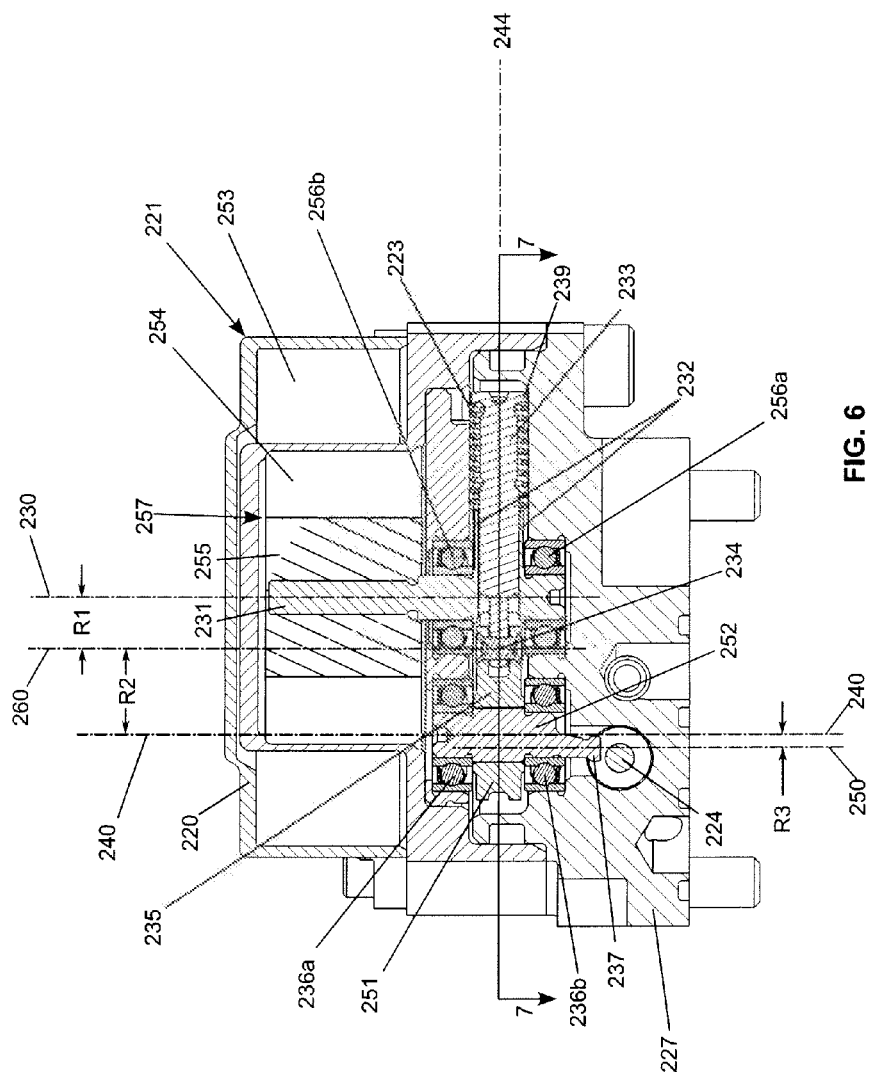
FIG. 6 is a vertical sectional view of the servo valve shown in FIG. 5 in a null configuration, taken generally along line 6-6 of FIG. 5.

As shown in FIGS. 3 and 6, sleeve 232 is a generally cylindrical tubular member generated about axis 244, an axis which is orientated generally perpendicular to output shaft axis 230. Shaft sleeve 232 defines a hollow cylindrical opening 232a in which pole shaft 233 is arranged. The inner diameter of hollow cylinder 232a is sized to receive pole shaft 233 such that sleeve 232 and pole shaft 233 are in sliding engagement with each other along axis 244 with minimal tolerance.

Pole shaft 233 includes head 239 at one end. Bias spring 223 is arranged to act between sleeve 232 and pole shaft head 239, urging the two apart along sliding axis 244. Pin joint opening 233a is located at the other end of pole shaft 233 from head 239. Pivot joint pin 234 slidably fits into opening 235a in drive link 235 and corresponding joint opening 233a in pole shaft 233 to create a pivot joint. Pin joint opening 233a, pivot joint pin 234 and link opening 235a are configured to form a floating pivot joint. In this embodiment, pin joint 234 is a wrist pin. However, other alternative pivot joints may be used.

Drive link 235 contains a second opening 235b in which quill drive shaft 252 is compressively held by set screw 251, as shown in FIG. 6. During normal operation, drive link 235 and quill drive shaft 252 are coupled and move as a single unit. However, set screw 251, which holds drive link 235 to quill drive shaft 252, can be loosened during calibration as desired to adjust the relative rotational and vertical position between drive link 235 and quill drive shaft 252. Quill drive shaft 252 also has upper and lower journal surfaces for rotational engagement with housing body 227 such that quill shaft 252 rotates relative to body 227 about vertical axis 240.

Quill 237 is located on the bottom end of quill drive shaft 252. Quill 237 has a generally spherical shaped outer surface for making contact with valve spool 224. Valve spool 224 is a conventional hydraulic spool valve. Quill 237 is not arranged along central shaft 240 of quill shaft 252. As a result of this offset, when quill shaft 252 rotates relative to body 227, it moves in an arc about axis 240. While in this embodiment the contact element to spool 224 is a quill, alternative contact elements may be used, including without limitation a drive knob, diamond surface or other similar force transfer elements.

Valve spool 224 is configured and arranged for slidable engagement in cylinder 238 of valve body 227. As quill shaft 252 is rotated, quill 237 causes valve spool 224 to move within cylinder 238. Valve spool 224 has a number of cylindrical lands 241a-f, which are configured to have a tight radial tolerance with cylinder 238 in order to minimize hydraulic leakage of fluid across each land.

As torque motor 221 causes output shaft 231 to rotate, output shaft sleeve 232 causes pole shaft 233 to rotate as well. As pole shaft 233 rotates, it pushes on pin joint 234, which pushes on drive link 235. Drive link 235 is thereby caused to rotate. Quill shaft 252 is rigidly coupled to drive link 235 and therefore rotates together with drive link 235. As quill shaft 252 rotates, it causes quill 237 to move and apply a force against valve spool 224, causing valve spool 224 to slide within cylinder 238.

Figure 5:
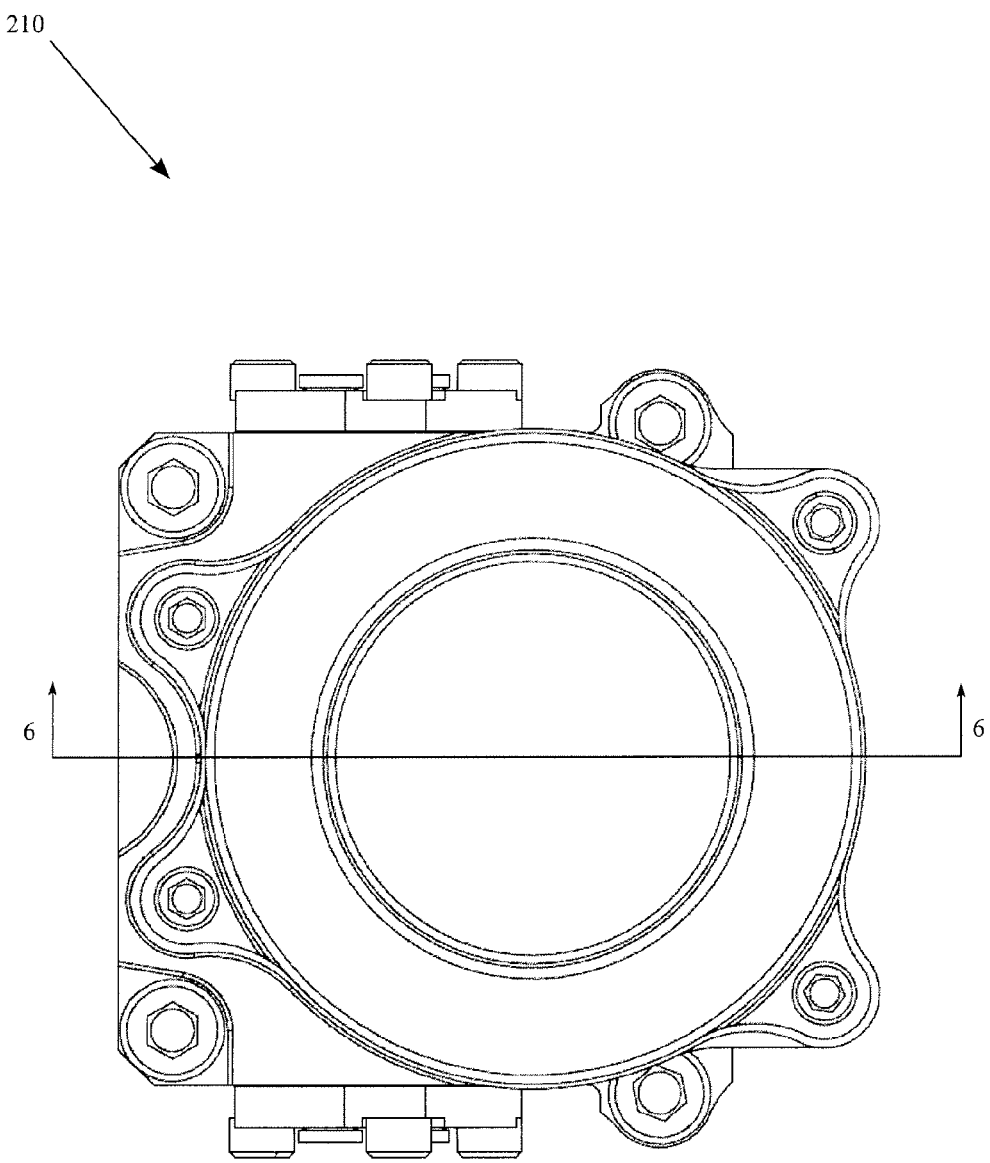
FIG. 5 is a top view of the servo valve shown in FIG. 2.
Figure 7:
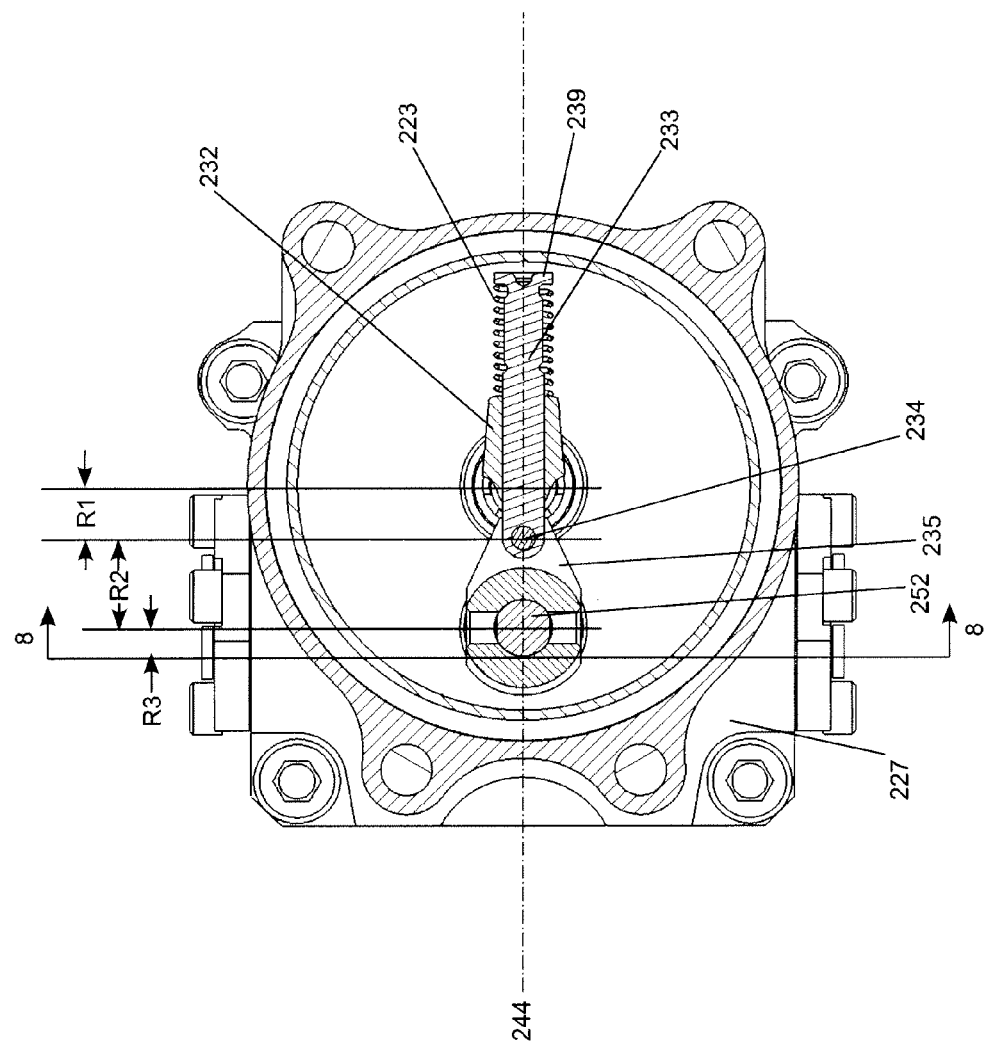
FIG. 7 is a horizontal sectional view of the servo valve shown in FIG. 6, taken generally along line 7-7 of FIG. 6.

FIG. 5 is a top view of first embodiment valve system 210 in a first null configuration, in which the valve is off. FIG. 6 is a vertical section view taken along line 6-6 in FIG. 5, and FIG. 7 is a horizontal section view taken along line 7-7 in FIG. 6. As shown in FIG. 6, electric motor 221 is arranged within the chamber formed by housing 220 and valve body 227. Electric motor is a rotary motor with axis of rotation 230. Stator 253 and rotor region 257 are both generally symmetric about axis of rotation 230. Stator 253 is coupled to housing 220 and contains coils. Rotor 257 is mounted for rotary movement relative to stator 253 about axis of rotation 230. Rotor 257 contains permanent magnet region 254 along its outer circumference, iron core region 255 radially inside of permanent magnet region 254, and motor output shaft 231 arranged centrally. Motor output shaft 231 is rotationally coupled to valve body 227 through annular bearings 256a and 256b. Motor output shaft sleeve 232 is formed from the same metal casting as output shaft 231.

As shown in FIG. 6, pole shaft 233 is arranged concentrically within output shaft sleeve 232. Pole shaft 233 is configured and arranged for left and right sliding engagement with output shaft sleeve 232 along axis 244. Bias spring 223 is a compressed spiral coil spring, arranged concentrically along pole shaft 233's outer cylindrical surface, and acts between the leftwardly-facing vertical annular surface of pole shaft head 239 and the rightwardly-facing vertical annular surface of output shaft sleeve 232.

Pole shaft 233 and drive link 235 are mechanically coupled by pivot joint pin 234. Pivot joint 234 is said to be a floating pivot joint since its axis of rotation is not fixed relative to valve body 227. Pivot joint pin 234 has centerline 260 which is displaced by distance R1 from motor output axis 230. Drive link 235 includes set screw 251 to compressively hold quill drive shaft 252. Quill drive shaft 252 is supported by annular upper and lower bearings 236a and 236b, which allow quill drive shaft 252 to rotate relative to valve body 227 about quill drive shaft axis 240. Quill drive shaft axis 240 is displaced by horizontal distance R2 from pivot joint pin centerline 260.

Centerline 250 of quill 237 is displaced by distance R3 from quill drive shaft axis of rotation 240. Quill 237 comes into contact with valve spool 224. Valve spool 234 is arranged and oriented for sliding engagement within valve cylinder 238 of valve body 227 in a direction perpendicular to axis 244.

FIG. 7 shows distance R1 between motor output shaft 231 center and pivot joint pin 234. Also shown is distance R2 between pivot joint pin 234 and the center drive shaft 252 center. Pole shaft 233 moves leftwards and rightwards along axis 244 relative to sleeve 232. Section line 8-8 passes through quill centerline 250.

Figure 8:
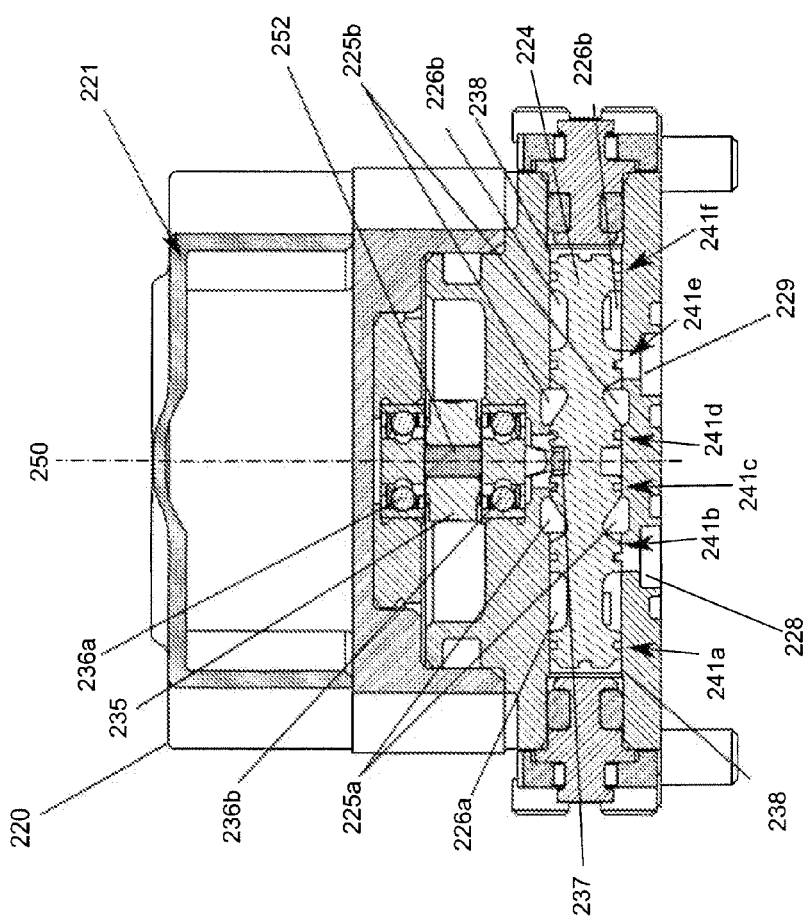
FIG. 8 is a vertical sectional view of the servo valve shown in FIG. 7 in a null configuration, taken generally along line 8-8 of FIG. 7.

FIG. 8 is a vertical section of valve system 210 taken along line 8-8 in FIG. 7. Note that the vertical section of FIG. 8 is taken through the center of quill 237. The configuration shown in FIG. 8 is a null configuration in which the valve is closed. Valve spool 224 contains lands 241a, 241b, 241c, 241d, 241e, and 241f. Quill 237 is arranged horizontally between the upper right face of land 241c and the upper left face of land 241d. Minimal or no tolerance is maintained between quill 237 and lands 241c and 241d. As described in further detail below, as quill 237 is caused to move through quill shaft rotation, quill 237 pushes against land 241c or land 241d, causing valve spool 224 to move left or right within cylinder 238. In order to minimize wear caused by sliding friction between valve spool lands 241c, 241d and quill 237, quill 237 may be made of a hard substance such as diamond.

As shown in the null configuration of FIG. 8, hydraulic flow between hydraulic control port 228 and cylinder 238 is blocked by land 241b. Similarly, hydraulic flow between control port 229 and cylinder 238 is blocked by land 241e.

Hydraulic supply line 225 communicates with left hydraulic supply chamber 225a and right hydraulic supply chamber 226b, shown in FIG. 8. Hydraulic supply chambers 225a and 225b are at a high pressure. In the null configuration shown in FIG. 8, high pressure hydraulic fluid in chamber 226a is prevented from flowing leftwards by spool land 241a and is prevented from flowing rightwards by valve land 241b. Similarly, high pressure hydraulic fluid in chamber 226b is prevented from flowing leftwards by valve spool 241e and rightwards by spool land 241f.

Hydraulic return line 226 communicates with left hydraulic return chamber 226a and right hydraulic return chamber 226b. Hydraulic return chambers 226a and 226b are at a low hydraulic pressure. In the null configuration shown in FIG. 8, hydraulic fluid is prevented from flowing into chamber 225a from the left by spool land 241b and is prevented from flowing into chamber 225b from the right by land 241e.

As valve spool 224 is moved left or right, spool lands 241b and 241e are no longer aligned along control ports 228 and 229, respectively, which allows fluid to flow from the high and low pressure chambers to or from control ports 228 and 229, depending upon the direction valve spool 224 is moved.

Figure 9:
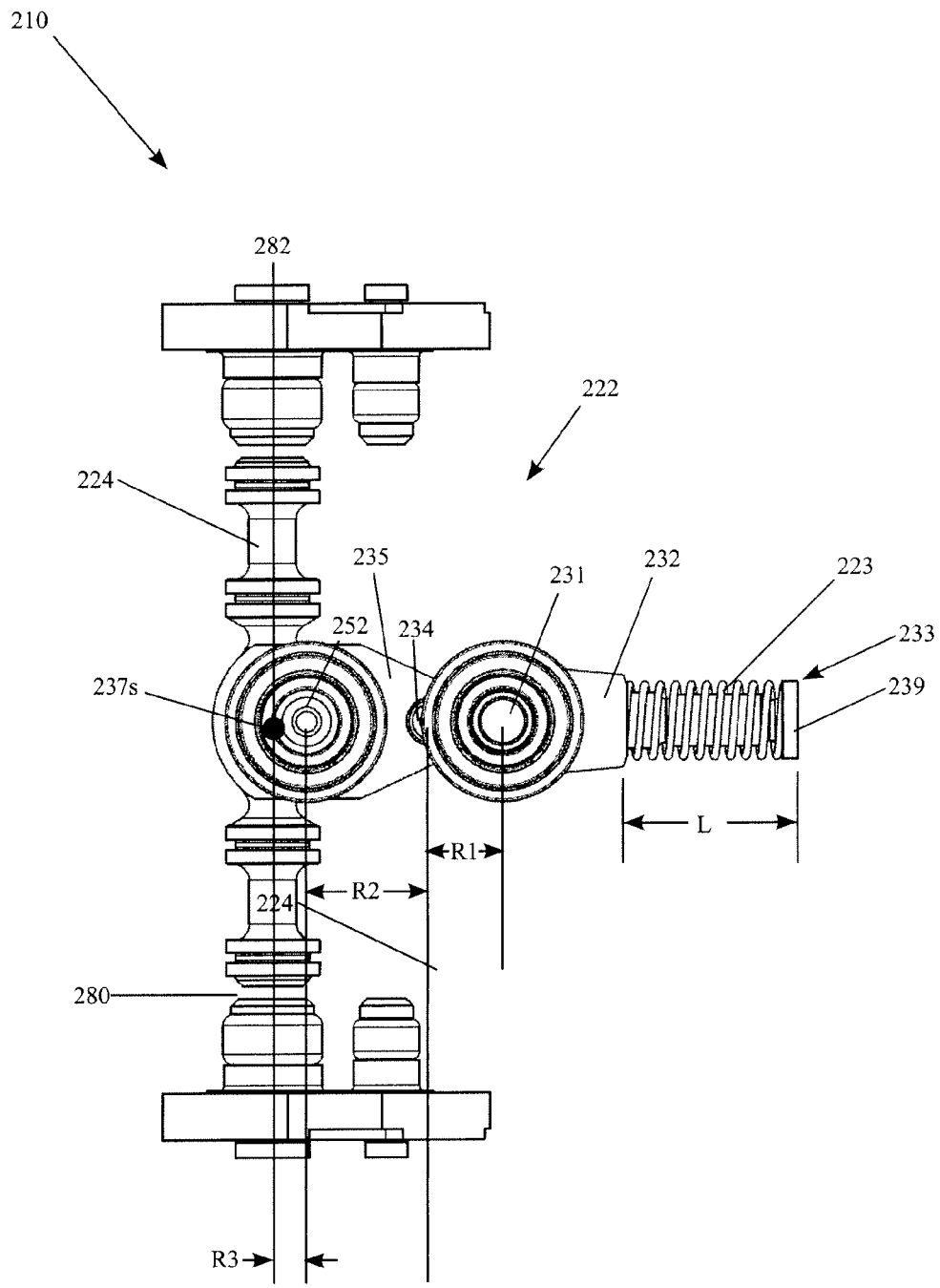
FIG. 9 is a top partial view of the servo valve shown in FIG. 6 in a null configuration.

FIG. 9 is a partial top view of the valve system in the null configuration. Spool valve 224 slides up and down along axis 282. The lower end of valve spool 224 is aligned at position 280 when in the null configuration. Also, as shown in FIG. 9, pole shaft 233, sleeve 232, and drive link 235 are oriented horizontally (perpendicular to axis 282) when in the null position. Compressed spring 223 has a length of L, constrained between pole shaft head 239 and sleeve 232. Even though quill 237 is obscured from view by quill drive shaft 237 in FIG. 9, a representative "shadow" of quill 237 is shown at 237s in FIGS. 9 and 11.

The distance between the center of output shaft 231 and the center of pivot joint pin 234 is R1. The distance between the center of pivot joint pin 234 and quill drive shaft 252 axis of rotation is R2. Quill 237 (not shown in FIG. 9) is centered along axis 282. The distance between quill drive shaft 252 axis of rotation and the center of quill 237 is R3.

Figure 10:
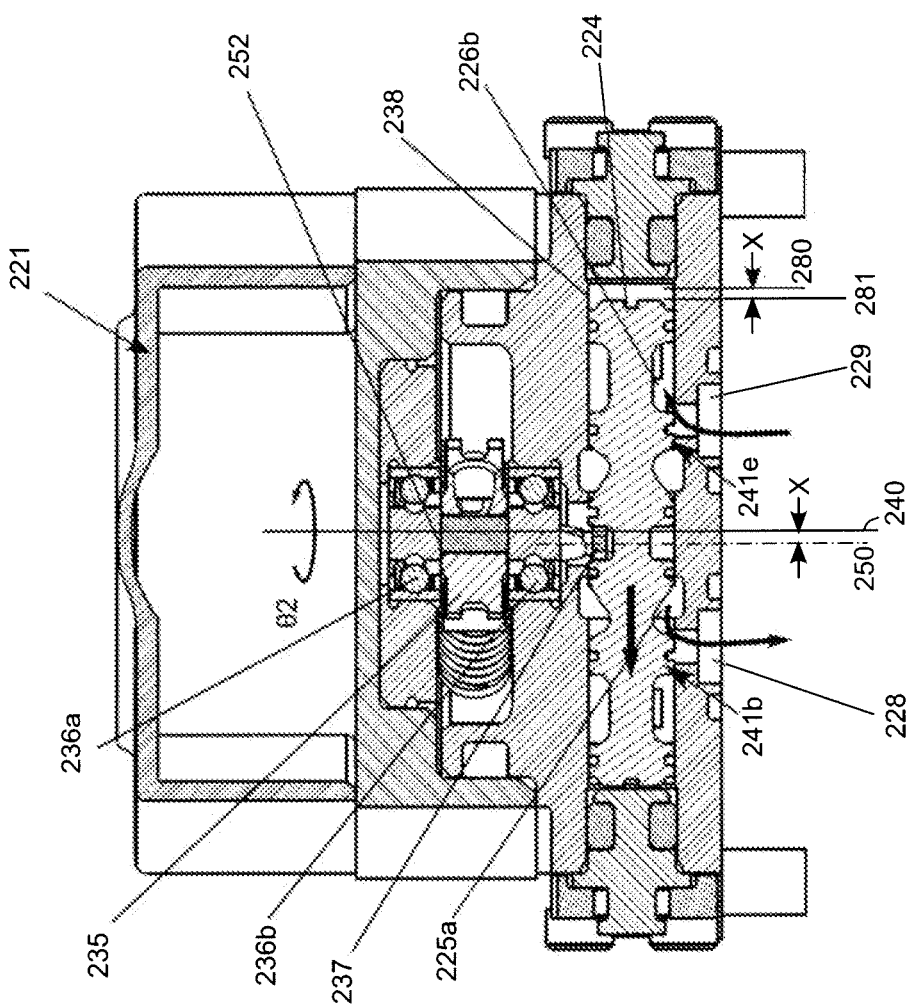
FIG. 10 is the vertical sectional view of the servo valve shown in FIG. 7 in an activated configuration, taken generally along line 8-8 of FIG. 7.
Figure 11:
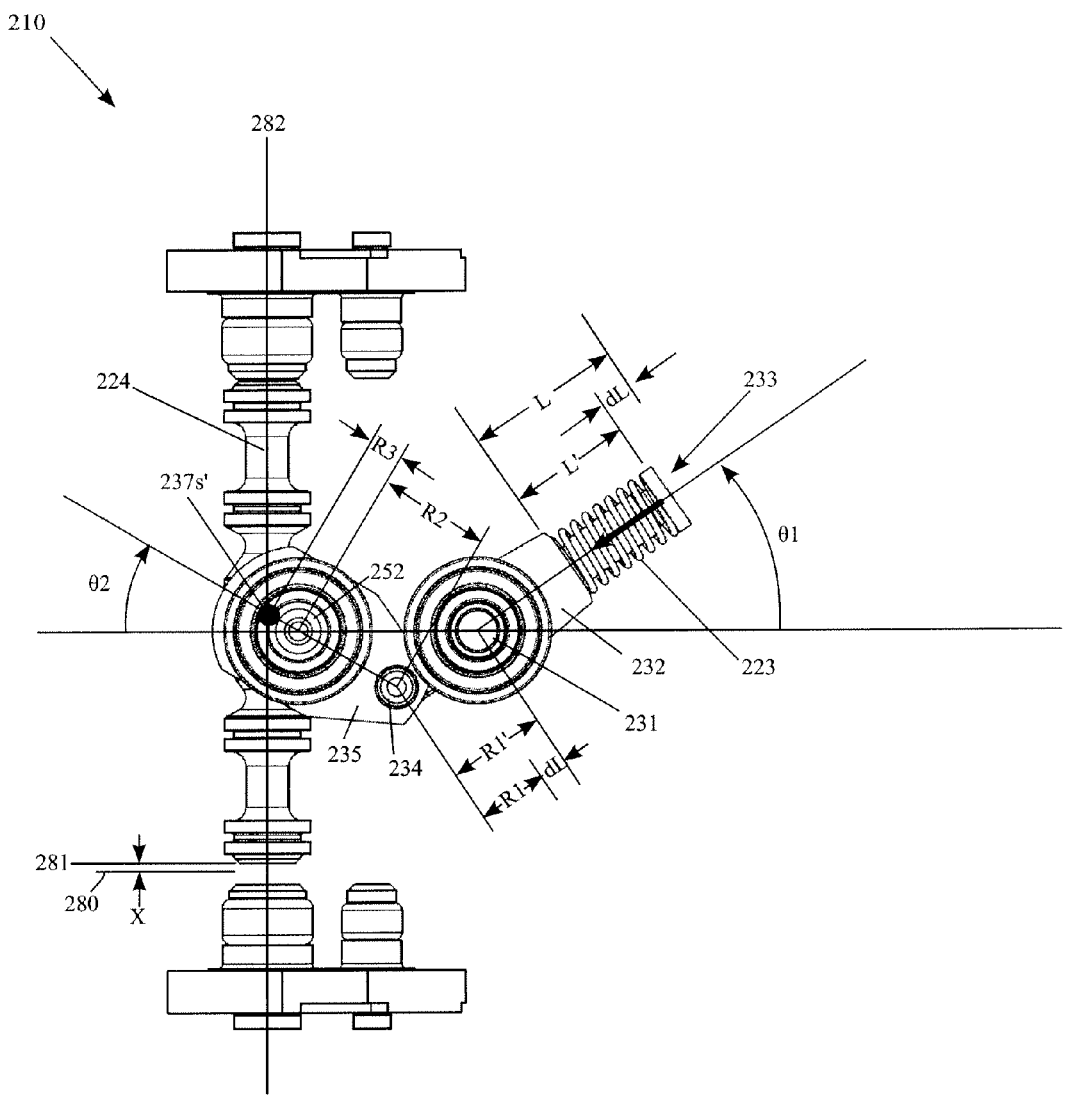
FIG. 11 is a top partial view of the servo valve shown in FIG. 10 in an active configuration.

FIGS. 10 and 11 show valve system 210 in an active configuration in which the system elements have been actuated from the null configuration shown in corresponding FIGS. 8 and 9.

As shown in FIGS. 10 and 11, quill drive shaft has been rotated clockwise by angle θ2. As shown in FIG. 10, both quill 237 and valve spool 224 have been moved leftwards. As shown in FIG. 11, both quill 237 and valve spool 224 have been moved upwards.

Referring back to FIG. 10, quill 237s' centerline has moved from being horizontally aligned with quill shaft axis of rotation 240 to position 250 by a horizontal displacement magnitude of X. Similarly, with reference to FIG. 11, spool 224's right end has moved upward from position 280 to position 281, also a vertical displacement magnitude of X.

In the active configuration shown in FIG. 10, spool lands 241b and 241e are no longer covering control ports 228 and 229 respectively. A gap is formed between left hydraulic supply chamber 225a and control port 228, which allows hydraulic fluid to flow from supply chamber 225a to control port 228. Similarly, a gap has formed between right hydraulic return chamber 226b and control port 229, which allows hydraulic fluid to flow from control port 229 to hydraulic return chamber 226b.

As shown in FIG. 11, output shaft 231 has been rotated counter clockwise by angle θ1. Sleeve 232 and pole shaft 233 have also been rotated counter clockwise by angle θ1. Pole shaft 233 has slid relative to sleeve 232 (leftwards and downwards as shown in FIG. 11) by an amount dL. Correspondingly, the distance between pivot joint pin 234's center and output shaft 231's center has decreased from R1 to R1', a reduction of amount dL.

As shown in FIG. 11, drive shaft 235 and coupled quill drive shaft 252 have rotated clockwise by angle θ2 about quill shaft axis of rotation 240 (see FIG. 10 for quill shaft axis of rotation 240). The shadow of quill 237 has moved from 237s to 237s'. Spool 224's bottom end has moved from position 280 to position 281, also a vertical displacement magnitude of X.

The mechanical linkage between output shaft 231 and valve spool 224 is a single degree of freedom linkage. Trigonometric equations can be used to find the functional relationship between output shaft rotation θ1 and the spool valve linear displacement X. Similarly, the change dL in bias spring 223's length can also be expressed as a function of θ1.

From observing FIG. 11, it should be clear that compressed spring 223's length is maximum when valve system 210 is in the null configuration shown in FIGS. 8 and 9. Because energy must be spent to compress spring 223 to a shorter length L' in an actuated configuration from the null configuration, it necessarily follows that absent any driving torque or external forces in the system besides spring 223, valve system 210 will be driven to the null configuration by spring 223.

In the following section, the operation of valve system 210 is described as it is actuated from the null configuration shown in FIGS. 8 and 9 to the actuated configuration in FIGS. 10 and 11.

Figure 14:
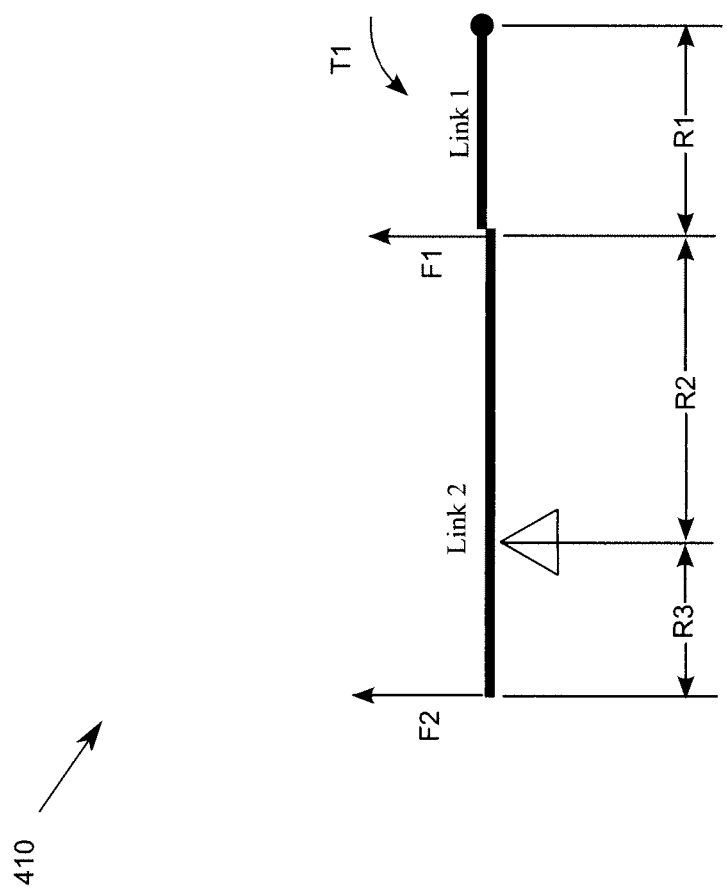
FIG. 14 is a free body diagram mechanical model of the system shown in FIG. 9.

Referring to FIG. 14, showing a mechanical model with valve system 210 in the null configuration, when electrical motor 221 applies a counter clockwise torque T1 to output shaft 231, mechanical linkage 222 transforms torque T1 into an upwards force F3 applied to spool 224. An equivalent system is shown in FIG. 14. The portion of pole shaft 233 that is left of the center of output shaft 231 is represented by "Link 1." Drive link 235 and quill drive shaft 252 effectively form a single rigid member since they are coupled together and are represented as "Link 2." The fulcrum is positioned to coincide with quill drive shaft 252's center. Link 1 and Link 2 interact through contact, corresponding to pin 234.

Electric motor 221 applies torque T1 onto Link 1. Link 1 applies a downwards force onto Link 2, which Link 2 must counter with upwards force F1. Cancelling the moments acting on Link 1 provides:

$$T1 - F1 \times R1 = 0$$

$$F1 = T1/R1$$

Acting as a lever, Link 2 applies an upward force F2 onto spool 224. Cancelling the moments on Link 2 provides:

$$F2 \times R3 - F1 \times R2 = 0$$

$$F2 = F1 \times R2/R3$$

Combining the above two equations provides:

$$F2 = (T1/R1) \times R2/R3$$

$$F2 = T1 \times R2/R1/R3$$

Thus, the mechanical advantage of mechanical linkage 222 is affected by R1, R2, and R3. The mechanical advantage can be increased by increasing R2, or by reducing either R1 or R3. Anytime that R2>(R1×R3), the mechanical advantage of mechanical linkage 222 will be greater than 1.

In summary, pole shaft 233, acting as a lever with a fulcrum at output shaft axis 230, transfers its torque through a force acting on pin joint 234. Pin joint 234 transfers this downward force to drive link 235. Drive link 235 also acts as a lever with a fulcrum centered about quill drive shaft axis 240. The length R2 between pin joint 234 and axis 240 acts as a first lever arm of drive link 235, and length R3 between axis 240 and contact element 237 acts as a second lever arm of drive link 235. The force applied to drive link 235 is transferred as an upward force applied by contact element 237 to valve spool 224.

In the null configuration, pin 234 is being pulled rightwards by spring 223 acting on pole shaft 233. We ignore this force on pin 234 for our calculation above since the force is completely horizontal and does not effect the torque calculations in the null configuration. It should be noted, however, that compressed bias spring 223 causes a horizontal force to be maintained across all joints of mechanical linkage 222, which acts to reduce backlash. For example, sleeve 232 and output shaft 231 are pushed leftwards by spring 223. A counteracting force is applied by the bearings in valve body 227 on shaft 231. Pivot joint 234 is pulled rightwards by pole shaft 233 and leftwards by the counteracting force in drive link 235. The bearings holding quill shaft 252 also counteract the rightwards force pulling on quill shaft 252 by drive link 235. Since these joints are pre-tensioned or pre-compressed, they will not exhibit significant backlash when output shaft 231 is actuated by electric motor 221.

The above equations completely describe the system only when valve system 210 is in the null configuration. As output shaft 231 rotates, the equations must be adjusted. Additionally, as output shaft 231 rotates, the effects of spring 233 on torque must begin to be accounted for.

As shown in FIG. 11, torque motor 221 has caused output shaft 231 to be driven counter clockwise by angle θ1. Output shaft sleeve 232 is rotated together with output shaft 231. Sleeve 232 applies a rotary torque to pole shaft 233. As pole shaft 233 is rotated counter clockwise, pivot joint pin 234 is forced downwards. However, since the distance between pin 234 and the center of quill drive shaft 252 is constrained to the fixed value R2, pin 234 must move leftwards as pole shaft 233 forces it downwards. In other words, as pin 234 moves downwards, drive link 235 pulls pin 234 leftwards.

In order for pin 234 to move leftwards, it must pull pole shaft 233 leftwards as well, causing pole shaft 233 to slide downwards and leftwards in sleeve 232. As pole shaft 233 slides in sleeve 232, spring 223 is compressed even further to length L'. The compressive force of spring 223 pulls upwards and rightwards on pin 234.

Figure 15:
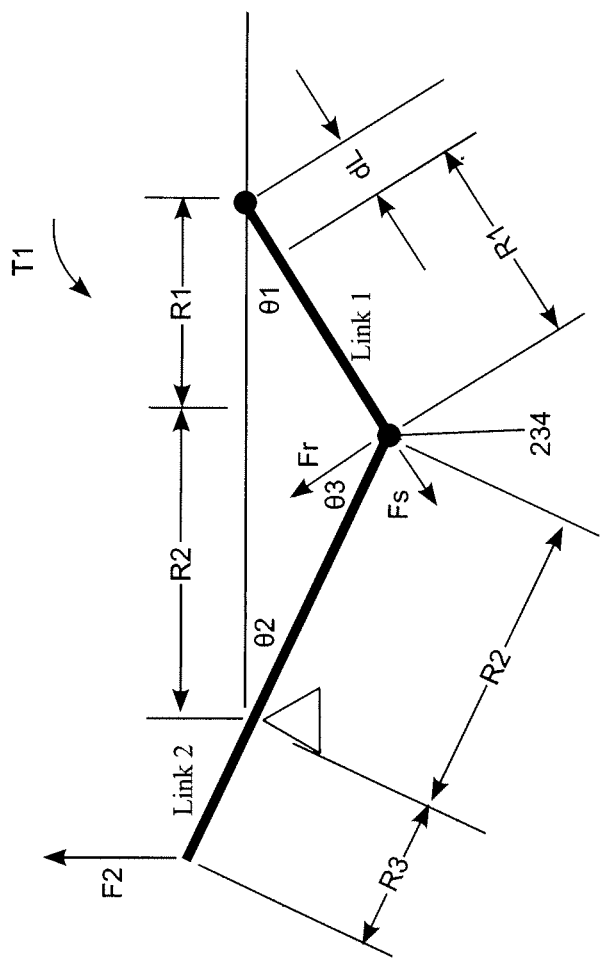
FIG. 15 is a free body diagram mechanical model of the system shown in FIG. 11.

FIG. 15 shows a mechanical model of the system in FIG. 11. Link 1 has been rotated counter clockwise by angle θ1. The length of Link 1 has increased by dL, the length that pole shaft 233 has slid in sleeve 232. Link 2 has been rotated clockwise by θ2 as pivot joint 234 was pulled downwards by the rotation of Link 1.

Figure 16:
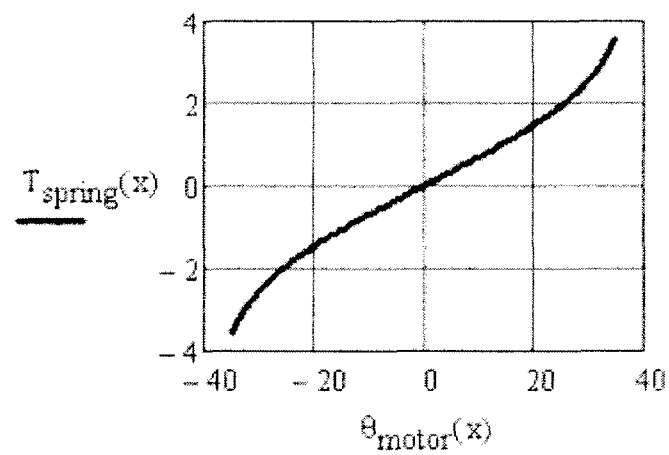
FIG. 16 is a graph showing the torque generated by the bias mechanism in the first embodiment as a function of the angle of rotation of the electric actuator output shaft.

Link 2 must counteract the spring force acting on pole shaft 233, a force shown as Fs. In order to cancel the moment created on Link 2 by force Fs, a perpendicular reaction force Fr must also be applied by Link 2 on Link 1. This reaction force Fr creates a restoring torque on Link 1. Effectively, this shows how the force from bias spring 223 causes a restoring torque on output shaft 231 that drives output shaft 231 to the null configuration. FIG. 16 shows an example spring torque applied to output shaft 231 as a function of output shaft angle for a given spring constant used in valve system 210.

When calculating the force F2 applied to spool 224, we must subtract the spring torque from the torque applied by electric motor 231 for a given angle of rotation θ1.

Also, as shown in FIG. 15, it can be seen that the equations for mechanical advantage calculation must be adjusted. It is easiest to analyze the mechanical advantage of the linkage without taking into account the spring force (Fs=0).

If electric motor 231 applies a torque T1 to Link 1, in equilibrium, this torque must be counteracted by the force Fr applied by Link 2. The angle that Fr makes with Link 2 to is θ3. Since Fr is perpendicular to Link 1, we have:

$$θ3 = 180 - θ1 - θ2 - 90$$

$$θ3 = 90 - θ1 - θ2$$

The moment balance equation for Link 1 provides:

$$T1 - Fr \times (R1 + dL) = 0$$

$$Fr = T1/(R1 + dL)$$

The moment balance equation for Link 2 thus provides:

$$Fr \times \sin(θ3) - F2 \times \sin(θ2) = 0$$

$$Fr \times \sin(90 - θ1 - θ2) - F2 \times \sin(θ2) = 0$$

$$Fr \times \sin(90 - θ1 - θ2) = F2 \times \sin(θ2)$$

$$F2 = Fr \times \sin(90 - θ1 - θ2)/\sin(θ2)$$

Substituting for Fr provides:

$$F2 = T1/(R1 + dL)/\sin(90 - θ1 - θ2)/\sin(θ2)$$

Also, the law of sines provides:

$$\sin(θ2)/(R1 + dL) = \sin(θ1)/R2 = \sin(180 - θ1 - θ2)/(R1 + R2)$$

Solving this system of equations and plotting the results for a given spring constant yields FIG. 16, which graphically depicts the torque produced by spring 223 as a function of the angle of rotation θ1 of output shaft 231. As shown in the graph, the torque is zero only when the output shaft angle is 0, or in other words, when the valve is in the null position. In any other valve position, spring 223 will provide a torque to output shaft 231, urging the valve to the null position.

Figure 17:
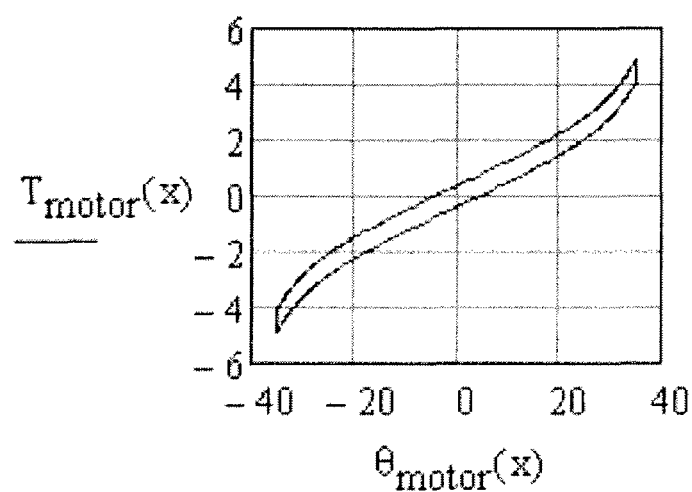
FIG. 17 is a graph showing the torque needed to be provided by the actuator as a function of the angle of rotation of the actuator output shaft.

Adding a friction coefficient and the effects of the Bernoulli force in hydraulic valves yields the example graph shown in FIG. 17.

The disclosed electro-hydraulic valve resulted in several surprising advantages. The disclosed electro-hydraulic valve is smaller, lighter, and faster than current hydraulic valves. Current hydraulic valves typically employ multiple hydraulic stages in order to control a large hydraulic force with a small force. Each of these additional hydraulic stages adds significant weight to the overall valve. Further, additional hydraulic stages increase the overall hydraulic leakage of the valve. The disclosed electro-hydraulic valve only has a single stage hydraulic valve portion. Because there is no need for additional hydraulic stages, the disclosed electro-hydraulic valve is smaller and lighter. Additionally, since the disclosed valve has only one hydraulic stage, it experiences less leakage than currently available multistage hydraulic valves.

Also, while conventional electro-hydraulic valves either must use a very large electric actuator to produce the forces necessary to move the valve spool, or alternatively use mechanical structures with significant backlash, the disclosed electro-hydraulic valve needs a comparatively small electric actuator since its mechanical linkage provides significant mechanical advantage in driving the valve spool.

Additionally, the disclosed electro-hydraulic valve comprises a unique mechanical linkage which produces minimal backlash. Because the mechanical linkage contains no gears, and is under constant structural bias from the spring, the mechanical linkage experiences almost no backlash.

Furthermore, the disclosed electro-hydraulic valve has the advantage of an inherent feedback mechanism and anti-backlash mechanism due to the design of its bias mechanism.

Figure 12:
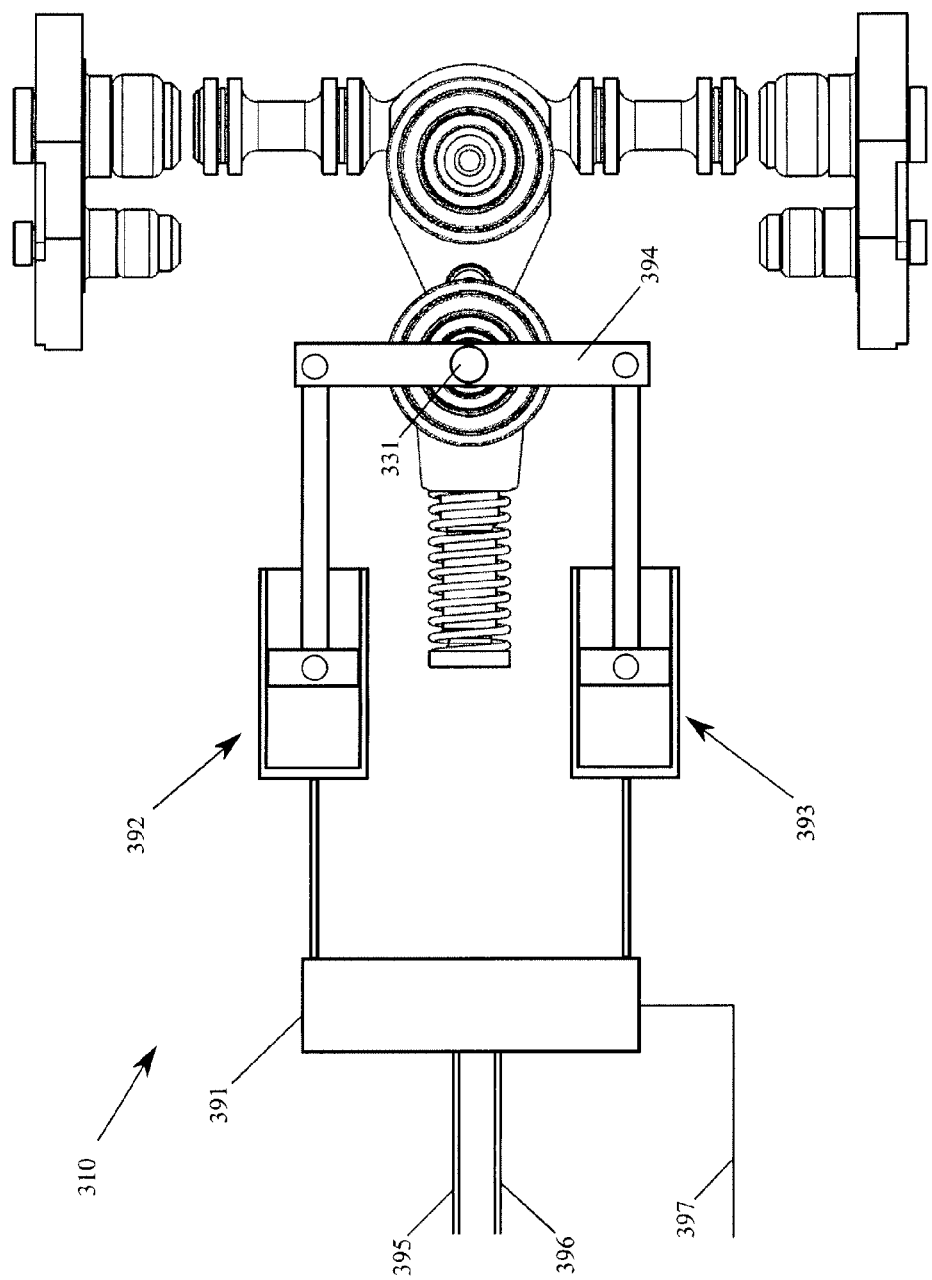
FIG. 12 is a top partial view of a second specific embodiment of the servo valve.

Various alternative embodiments of the disclosed electro-hydraulic valve are possible. For example, FIG. 12 shows second embodiment 310 of the electro-hydraulic valve in which the electric actuator is an electronically controlled MEMS (microelectromechanical system) valve 391 that controls a hydraulic amplifier stage. MEMS vale 391 receives hydraulic supply line 395 and hydraulic return line 396. Hydraulic flow is controlled to first micro hydraulic actuator 392 and second hydraulic micro actuator 393, Micro actuators 392 and 393 have their outputs connected to drive arm 394 which is mounted on output shaft 331.

Figure 13:
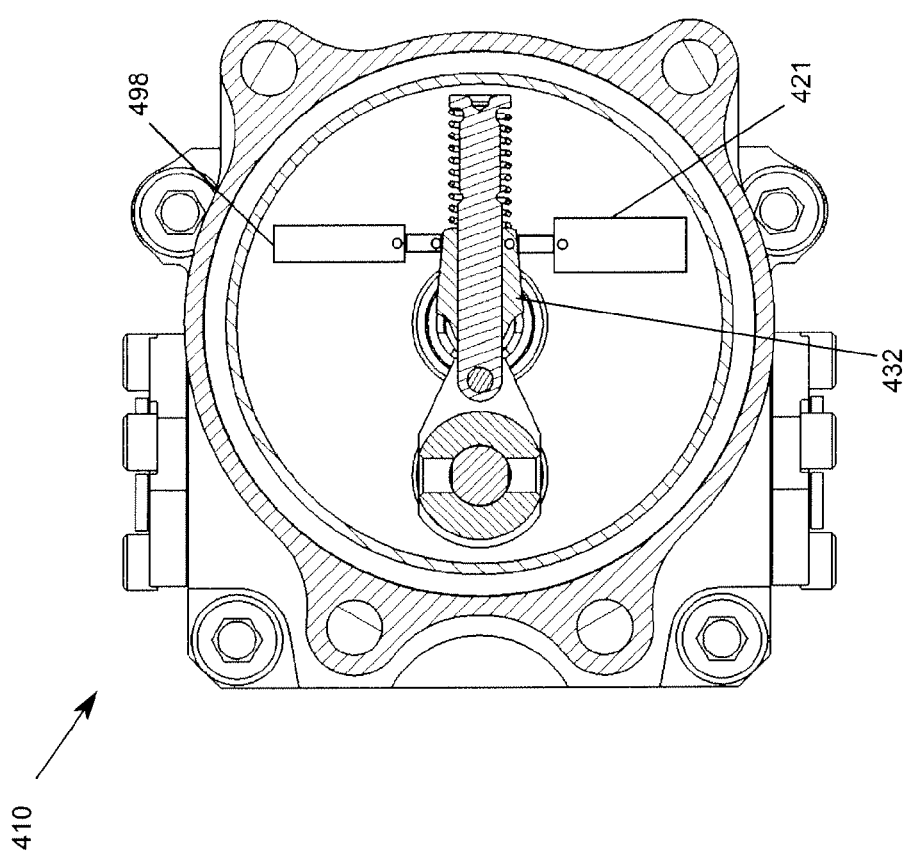
FIG. 13 is a top partial view of a third specific embodiment of the servo valve.

In yet another alternative, shown in FIG. 13 at 310, the electric actuator is solid state actuator 421. Preload spring 498 is mounted opposite solid state actuator 421 in order to allow actuator 421 to be able to move sleeve 432 both clockwise and counter-clockwise.

Therefore, while the presently-preferred form of the electro-hydraulic valve has been shown and described, and several modifications discussed, persons skilled in this art will readily appreciate that various additional changes may be made without departing from the scope of the invention.

The invention claimed is:

1. An electro-hydraulic valve comprising:
   a rotary electric motor comprising an output shaft orientated about a motor axis;
   a hydraulic valve comprising a valve drive spool configured and arranged to move relative to a valve cylinder from a first position to a second position;
   a mechanical linkage between said output shaft and said drive spool;
   said mechanical linkage comprising:
      a sleeve mechanically coupled to said output shaft;
      a pole shaft configured and arranged for sliding engagement relative to said sleeve in a direction generally perpendicular to said motor axis;
      a link connected to said pole shaft by a pivot joint;
      a drive shaft coupled to said link and configured and arranged to rotate about a drive axis;
      said drive shaft having an end portion configured and arranged to engage and apply a force to said spool;
      a spring configured and arranged to provide a bias between said pole shaft and said sleeve;
   said mechanical linkage configured and arranged such that a distance between said motor axis and said pivot joint multiplied by a distance between said drive axis and said applied force is less than a distance between said drive axis and said pivot joint; and
   wherein rotation of said electric motor causes said drive spool to move from said first position to said second position.

2. The electro-hydraulic valve set forth in claim 1, wherein said electric motor is selected from a group consisting of a torque motor, a toroidal motor, and a solid state actuator.

3. The electro-hydraulic valve set forth in claim 1, wherein said first position is a closed position and said second position is an open position.

4. The electro-hydraulic valve set forth in claim 1, wherein said end portion is a quill.

5. The electro-hydraulic valve set forth in claim 1, wherein said drive shaft is supported in a bearing.

6. The electro-hydraulic valve set forth in claim 1, wherein said spring is configured and arranged to urge said pole shaft relative to said sleeve so as to decrease said distance between said motor axis and said pivot joint.

7. The electro-hydraulic valve set forth in claim 6, wherein said spring is configured and arranged to be in a compressed state when said drive spool is in said first position and to be in a compressed state when said drive spool is in said second position.

8. The electro-hydraulic valve set forth in claim 1, wherein said spring is configured and arranged to reduce backlash in said mechanical linkage.

9. The electro-hydraulic valve set forth in claim 1, wherein said drive shaft is coupled to said link by compressive engagement and said compression is adjustable with a set screw.

* * * * *